United States Patent [19]
Athon et al.

[11] Patent Number: 5,947,510
[45] Date of Patent: Sep. 7, 1999

[54] AIR BAG MODULE

[75] Inventors: James Ray Athon, Macomb Township, Macomb County; Gerald M. Fowler, Troy, both of Mich.

[73] Assignee: Breed Automotive Technology, Inc., Lakeland, Fla.

[21] Appl. No.: 09/075,499

[22] Filed: May 8, 1998

[51] Int. Cl.[6] .................................................. B60R 21/16
[52] U.S. Cl. ........................................ 280/728.2; 280/732
[58] Field of Search .................................. 280/728.2, 732

[56] References Cited

U.S. PATENT DOCUMENTS

| | | | |
|---|---|---|---|
| 5,419,584 | 5/1995 | Halford | 280/728.2 |
| 5,433,472 | 7/1995 | Green et al. | 280/728.2 |
| 5,582,422 | 12/1996 | Kelly et al. | 280/728.2 |
| 5,639,112 | 6/1997 | Phillion et al. | 280/728.2 |

*Primary Examiner*—Kenneth R. Rice
*Attorney, Agent, or Firm*—Markell Seitzman

[57] ABSTRACT

An air bag module (20) comprising: an air bag (42) including a neck (44) through which inflation gas is received, the neck having a plurality of ends or flaps (46a–d). The module further includes a housing (22) having upper (24) and lower (26) housing members each with a respective flange (28, 50), a respective one of the flaps (46a–d) is sandwiched between the flanges. The lower housing member (26) includes an inflator-receiving portion (60), comprising a side wall (62) and opposing first and second end walls (64a, 64b), wherein each end wall includes a respective opening (66, 68). An inflator (70) is received within and supported by the inflator-receiving portion (60), the inflator includes a first end (76, 78) a part of which is received with the opening (68) in a second end wall (64b) to close the opening (68), an outwardly movable threaded nut (80, 82) for securing the inflator to the first end wall (64a), for enclosing the opening (66) in the first end wall (64a) and for generating an outward load on the first end wall (64a) and in so doing generating an outward reaction load on the second end wall (64b).

11 Claims, 9 Drawing Sheets

FIG.-14c

AIR BAG MODULE

BACKGROUND AND SUMMARY OF THE INVENTION

The invention generally relates to safety restraint components, and more particularly to an air bag module having a two-piece housing as well as a means of securing an inflator to the housing.

It is an object of the present invention to secure an air bag between two housing members. A further object of the present invention is to provide an inflator mounting system in which the inflator mounting means is located within one of the housing members.

Accordingly the invention comprises: an air bag module comprising: an air bag including a neck through which inflation gas is received, the neck being a plurality of ends or flaps. The module further includes a housing having upper and lower housing members each with a respective flange; a respective one of the flaps is sandwiched between the flanges. The lower housing member includes an inflator-receiving portion, comprising a side wall and opposing first and second end walls, wherein each end wall includes a respective opening. An inflator is received within and supported by the inflator-receiving portion, the inflator includes a first end, a part of which is received within the opening in a second end wall to close the opening, mounting means for securing the inflator to the first end wall, for enclosing the opening in the first end wall and for generating an outward load on the first end wall and in so doing generating an outward reaction load on the second end wall. The mounting means includes a threaded stud and an outwardly movable nut received upon the stud.

Many other objects and purposes of the invention will be clear from the following detailed description of the drawings.

DETAILED DESCRIPTION OF THE DRAWINGS

Figure 1:
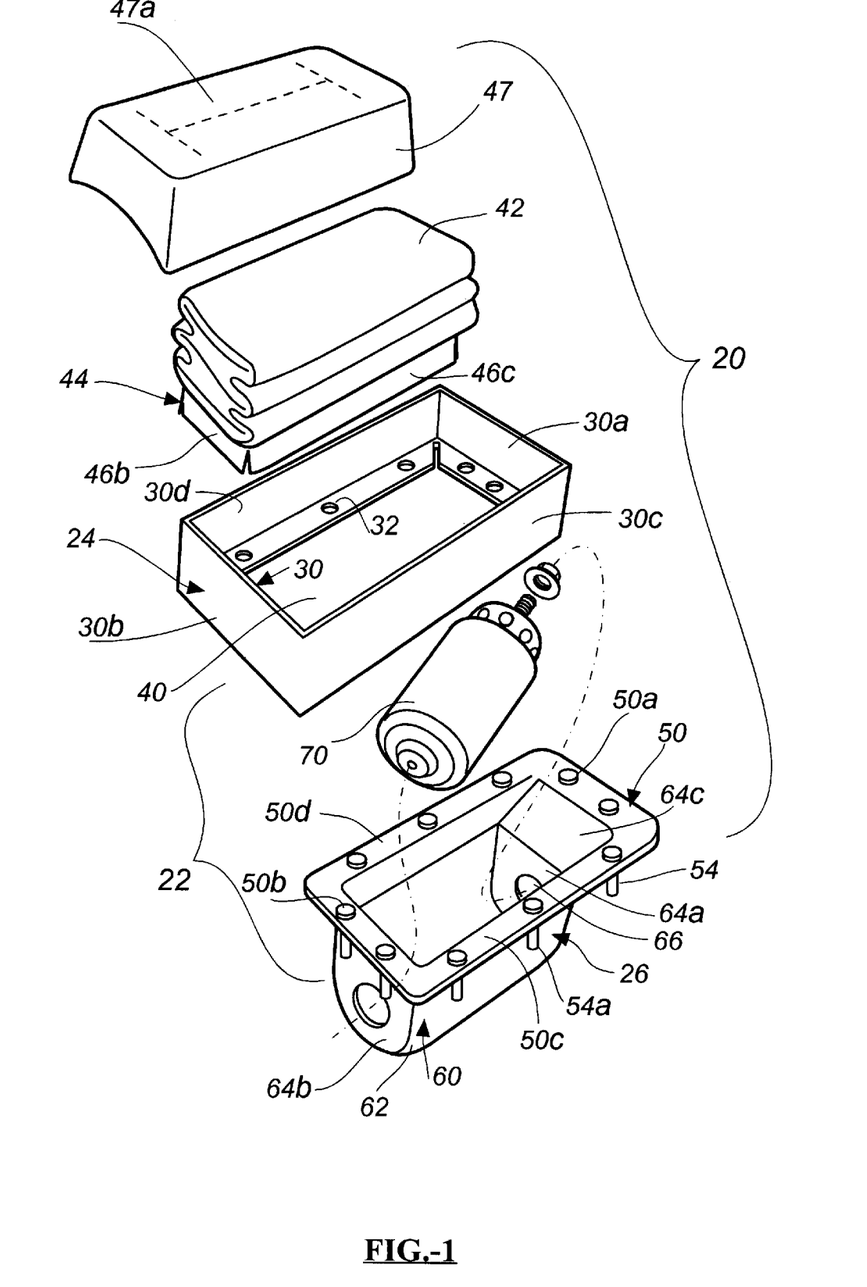
FIG. 1 is an exploded view showing many of the major components of the present invention.
Figure 2:
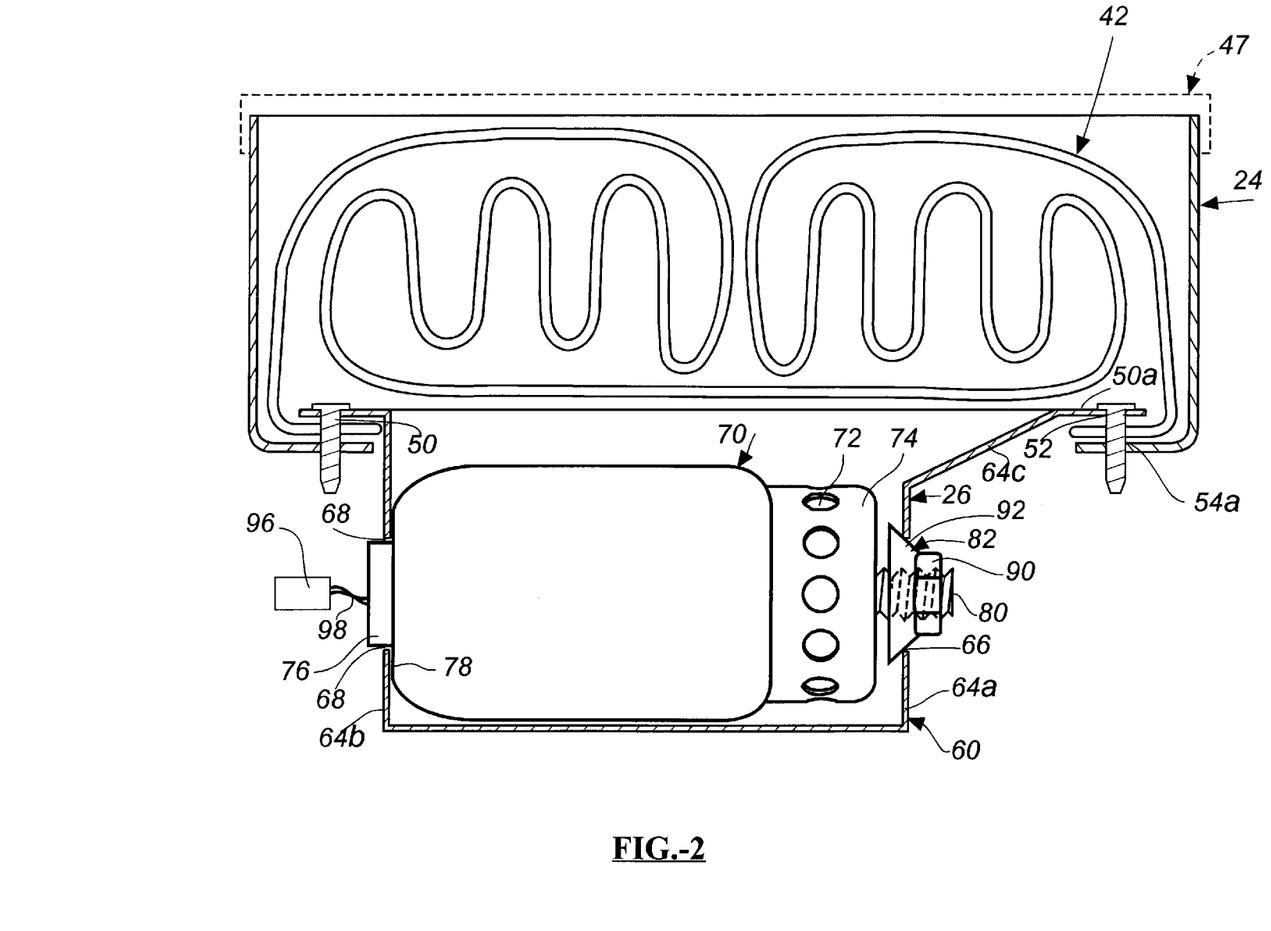
FIG. 2 is a cross sectional view illustrating a two-part housing, air bag and inflator.
Figure 3:
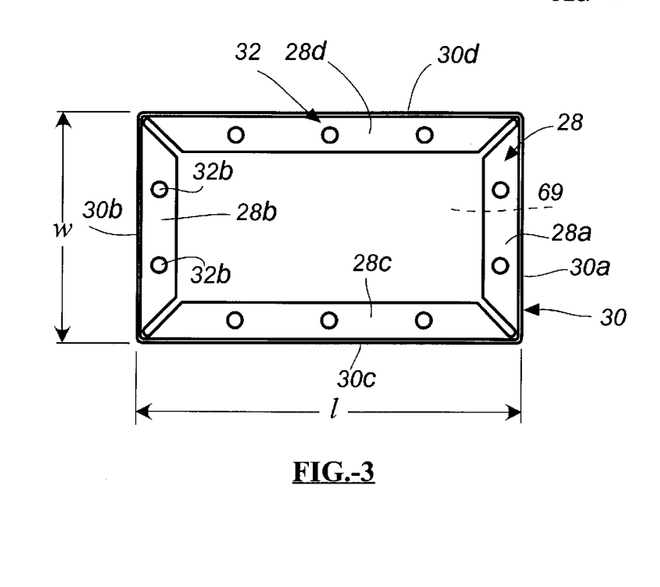
FIG. 3 is a top plan view of an upper housing member.

FIG. 1 illustrates the major components of the present invention. More specifically, the invention relates to an air bag module 20 comprising a housing 22 constructed of two nested housing members 24 and 26. The upper housing member 24 is hollow and includes a wall 30 having four sections 30a–30d. The lower portion of each section is trapezoidal in shape and bent inwardly to form a flange generally shown by numeral 28 with four flange sections 28a–28c which are also illustrated in FIG. 3. Each of the flange sections 28a–28d includes one or more mounting and alignment openings 32. As illustrated in FIG. 2, these openings are circular to comport with a circular pin 54a or threaded fastener 54. Other opening shapes can be used such as narrow slots. The wall 30 defines a central opening 40 into which is received an air bag 42 which has been folded into a configuration to fit therein. As will be described below, the air bag 42 includes a neck portion 44 having four separate end portions or flaps 46a–46d arranged in a generally rectangular configuration. The module 20 optionally includes a cover 47 which protectively encloses the air bag 42. The cover 47 includes a tear seam 47a and may be secured to the upper housing member 24 or to a vehicle member adjacent the mounted location of the module.

Figure 4:
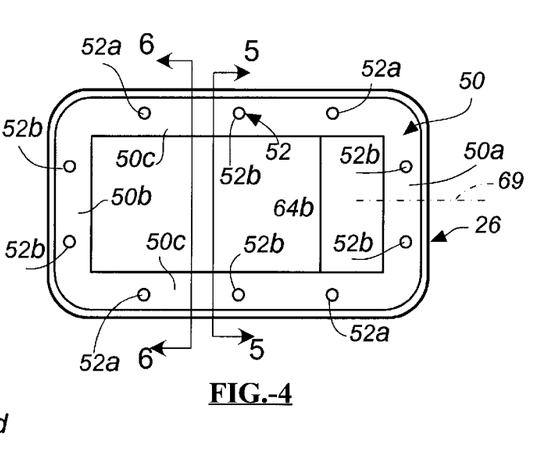
FIG. 4 is a top plan view of a lower housing member.
Figure 5:
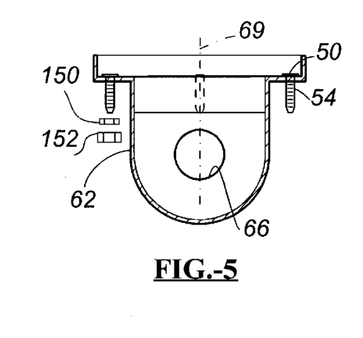
FIG. 5 is a cross sectional view taken through section 5—5 of FIG. 4.
Figure 6:
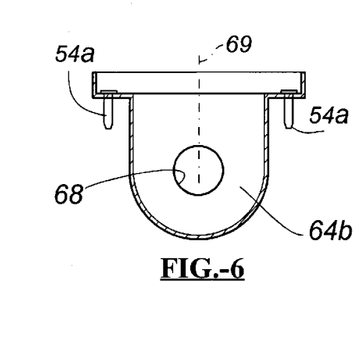
FIG. 6 is a cross sectional view taken through section 6—6 of FIG. 4.

In this embodiment the lower housing member 26 is nested within the upper housing member 24 and also supports an inflator 70. To achieve the nested configuration illustrated in FIG. 2, the lower housing member includes an outwardly extending flange 50 having side flange portions 50a–50d (see FIG. 4). Each of the flange side portions 50a–50d includes one or more openings 52 identical in number to openings 32 found in flange portions 28a–d. The lower portion 60 of housing member 26 functions as an inflator-receiving member. This portion 60 includes a curved side wall 62 and opposing end wall or end faces 64a and 64b. End wall 64a includes a mounting and alignment opening 66 while end wall 64b includes a mounting and alignment opening 68. Side wall 62 and end walls 64a and b extend downwardly from the flange 50. The inflator-receiving portion 60 is smaller than flange 50 or the length of the upper member 24. As a result of this, a top portion 64c of wall 64a is inclined and extends to the flange side 50a. The inflator-receiving portion 60 is, however, biased to the center relative to the width w of the upper housing member 22. As can be seen from FIGS. 5 and 6, the openings 66 and 68 are symmetrically oriented relative to a centerline 69.

Prior to installation of the lower housing member 26 into the upper housing member 24, a plurality of studs or pins are inserted into the openings 52 of the lower housing member 26. While threaded studs can be inserted within each of the openings 52, this will increase the cost of the module. It has been found that only four threaded studs need to be inserted in corresponding openings designated as 52a (see FIG. 4). A plurality of pins 54a may be inserted within each of the remaining openings 52b.

The dimensions of the flange 50 and the inflator-receiving portion 60 of the lower housing member 26 are chosen to permit the inflator-receiving portion 60 to be fitted within the opening 40 of the upper housing member 24 and the flange 50 to rest upon flange 28.

Reference is again made to FIG. 2. An inflator 70 is shown secured within the inflator-receiving portion 60 of the lower housing member 26. As illustrated, the inflator 70 diagrammatically illustrates a known hybrid inflator. As is known by one skilled in the art, a hybrid inflator includes a pressure vessel in which is stored a quantity of pressurized inflation gas. The inflator includes a quantity of propellant which when energized heats the inflation gas. The propellant is ignited by use of an igniter or squib of known variety. Burning of the propellant or energization of the squib causes a frangible burst disk to open, thereby permitting the heated, inflation gas to exit one or more exit ports, generally shown as 72, located within one end of the inflator body 74. As is typical of hybrid inflators, the exit port or ports 72 are located adjacent one end of the inflator body 74. The off-center orientation of the exit ports relative to the inflator body can also be used in other (solid propellant, liquid, etc.) inflators The purpose of the smaller inflator-receiving portion 60 of the lower housing member 26 is apparent from FIG. 2 as the offset construction of the inflator-receiving portion 60 relative to the side walls 30a and 30b of the upper housing member 24 permits the inflator to be mounted with its inflation port or ports 72 generally in the middle of the folded air bag 42. This mounting will encourage the air bag 42 to inflate generally symmetrically. The inflator 70 includes an extending boss 76 and shoulder portion 78 which abuts a portion of the wall 64b adjacent to opening 68. A threaded fastener such as 80 extends from the inflator body 74. Secured about the threaded fastener 80 is a threaded nut 82 having a narrow diameter hexagonally-shaped first portion 90 and a tapered, larger diameter conically-shaped second portion 92. With the nut 82 rotated outwardly upon the stud or fastener 80, the shoulder 78 is outwardly biased against wall 64b closing and sealing opening 68, and the nut 82 is outwardly biased such that the larger diameter, conical portion 92 forcibly abuts the opening 66, thereby closing and sealing same. This configuration also generates a compressive load on the stud 80 which favorably improves the performance of this stud 80.

The above-mentioned igniter or squib (not shown) is energized by a control signal generated by an electronic control unit (ECU) 96 which is communicated via a wire 98 to the squib.

Figure 7A:
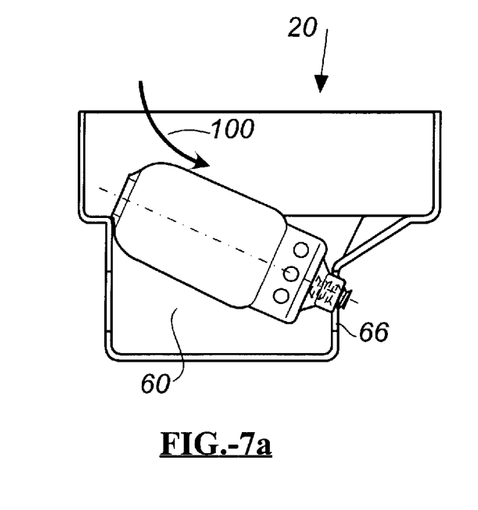
FIGS. 7a, 7b and 7c diagrammatically illustrate the stages of inserting an inflator into a lower housing member and also show an alternative embodiment of the invention.
Figure 7B:
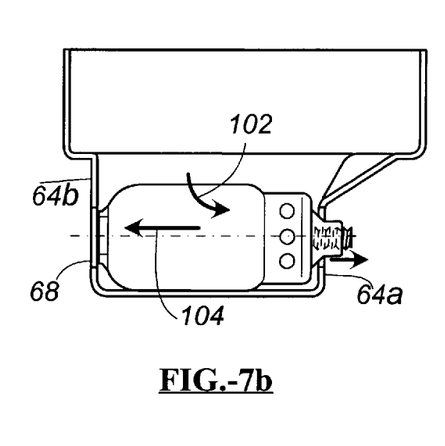
Figure 7C:
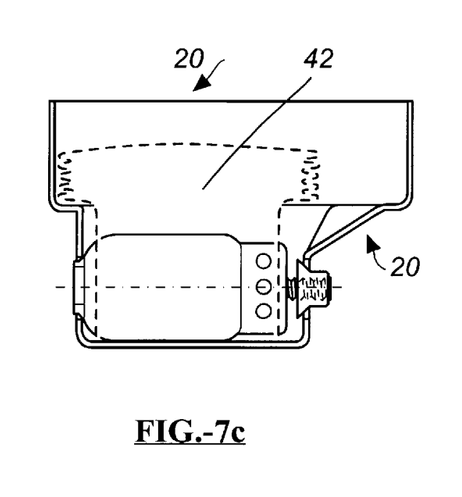

Reference is made to FIGS. 7a–7c which illustrate the steps used to position the inflator 70 within the housing. Portions of the housing have been eliminated for clarity of illustration. Inflator 70, with the nut 82 positioned relatively close to body 74, is inserted into the inflator-receiving portion 60 at an angle such that the narrow hexagonally-shaped end 90 extends through opening 66. Arrow 100 generally identifies the insertion path of the inflator.

With reference to FIG. 7b, the inflator 70 is rotated (see arrow 102) so that it is horizontal and then moved rearwardly (see arrow 104) such that the projection 76 extends out of opening 68 and shoulder 78 abuts wall 64b. In this configuration, part of the hexagonally-shaped end 90 of the nut 82 extends outwardly beyond wall or end 64a. Thereafter the nut 82 is rotated such that its conically-shaped portion 92 forcibly contacts the edges of opening 66 locking the inflator in place as illustrated in FIGS. 7c and 2. FIGS. 7a–7c serve to illustrate that this mounting feature of the invention can be used in single piece housing as well. Additionally, FIG. 7c diagrammatically shows in phantom line, the air bag 42 attached directly to the inflator 70 as opposed to being sandwiched between two adjacent housing members. In this context, the air bag can be attached to the inflator 70 and folded after the inflator is secured to the housing or alternatively the air bag can be folded into a bag pack and the bag pack and inflator jointly inserted into the housing. The air bag can be maintained in its folded configuration by enveloping it (and the inflator) with a loop of material which is torn as the air bag inflates.

Figure 8:
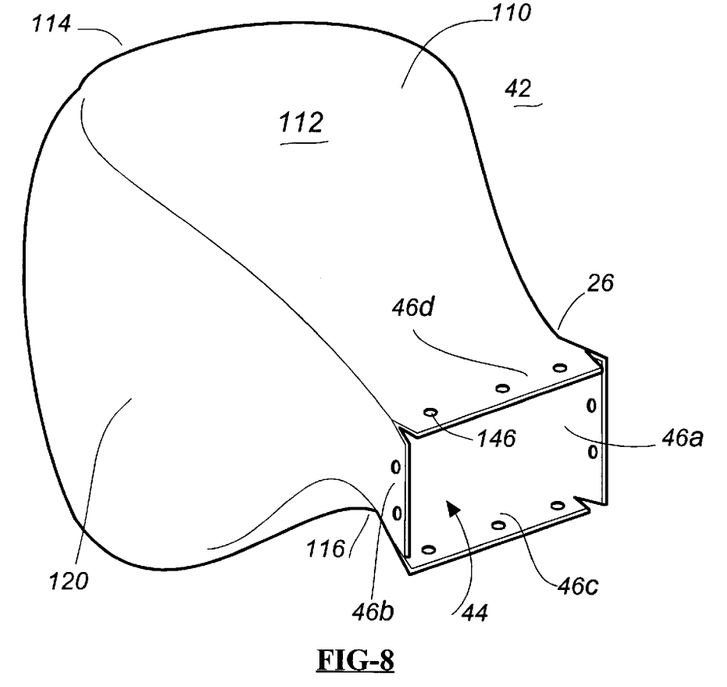
FIG. 8 diagrammatically illustrates an air bag.

Reference is briefly made to FIG. 8 which illustrates an assembled air bag 42. While there are many ways of constructing an air bag, this particular air bag utilizes a long, rectangular main panel 110 which forms the top 112, occupant contacting surface or face 114 and bottom 116. The main panel 110 is secured to two oblong side panels 120 (only one of which is illustrated in FIG. 8). The respective two ends 46a–b of the main panel 110, the end 46c of the first side panel 120 and 46d of the second side panel form the rectangular neck 44. Each of these ends is separated from one another thereby permitting these ends to be folded about and secured to the flange portions 50a–d of flange 50.

Figure 9:
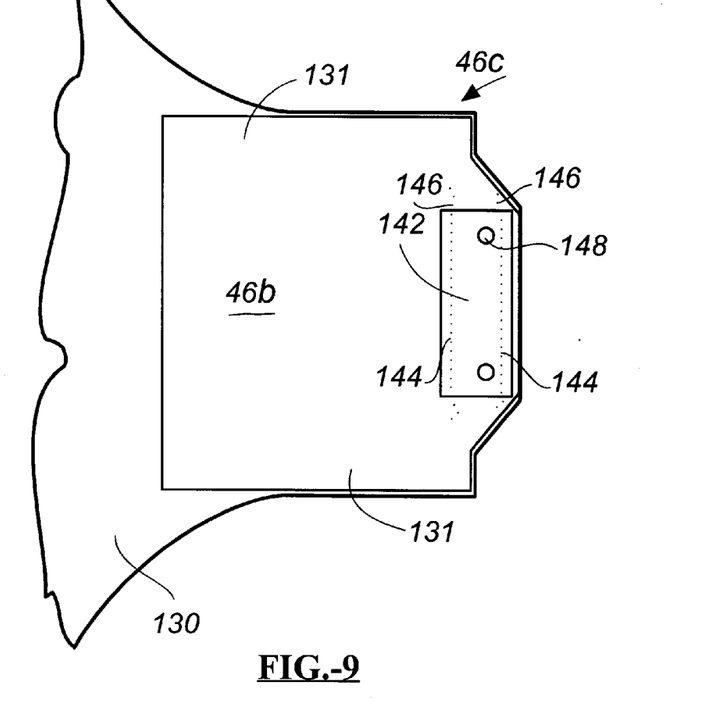
FIGS. 9 and 10 illustrate the details of construction of a portion of the air bag.
Figure 10:
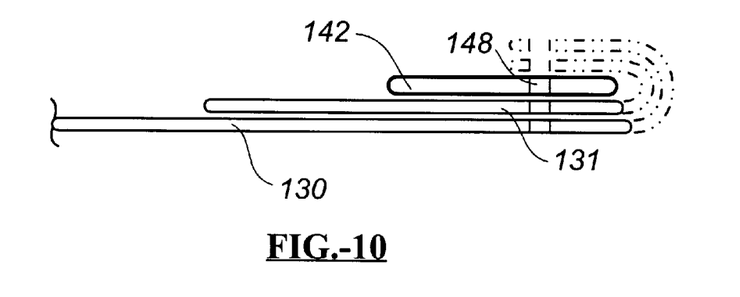

FIG. 9 illustrates one of the panel ends such as end 46ea. As is known in the art, air bags are typically constructed of woven, nylon or polyester. This is illustrated by numeral 130. Secured to the end of each respective panel is a heat shield 131 which may comprise an uncoated patch of woven air bag material or a coated patch, typically coated with silicon or neoprene. The dotted lines 146 illustrate the sew seams used to secure the heat shield 131 and a reinforcing material 142 to the woven material 130. In the present invention, the reinforcing material is a length of woven seat belt material. The dotted lines 146 illustrate two rows of stitches used to secure the heat shield and reinforcing material to the air bag panel. As can be appreciated, mounting holes need to fabricated within the air bag, heat shield and reinforcing material to enable same to receive the pins or fasteners. These mounting openings such as mounting openings 148 can be fabricated with each of the above pieces prior to assembly or formed such as by burning after the shield and reinforcing material have been secured. The number of openings corresponds to the number of threaded studs 54 and/or pins 54a that extend from each respective side flange 50a–d. FIG. 10 also shows an optional construction of the air bag 42. Reference is briefly made to the right-hand portion of FIG. 10. An extending portion of both the air bag panel 130 and the heat shield 131 can also be folded over and sewn to the reinforcing material 142. This is shown by the phantom lines.

Figure 10A:
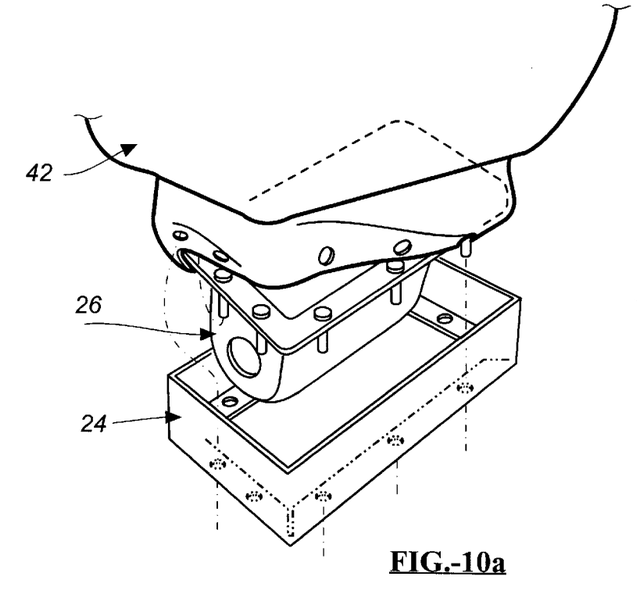
FIG. 10a illustrates the assembly of an air bag to a lower housing member.

The lower housing member 26 is positioned relative to the neck 44 of the air bag and the various sides 46a–d are folded about a respective side 50a–d of the flange 50 (as shown in FIG. 10a) wherein a respective fastener 54 and/or pin 54a extends through one of the openings 148 in the air bag. Subsequently, the lower housing member 26, with the air bag 42 attached thereto, is slid within or nested within the upper housing member 24 such that the various threaded fasteners 54 or locating pins 54a fit through a respective one of the openings 32 in the flange 28. Each of the fasteners 54 (see FIG. 5) is secured by a washer 150 and threaded nut 152. A flanged nut can be substituted for the washer and nut. The pins 54a merely extend through a corresponding opening 32 and support and restrain the cushion.

Figure 11A:
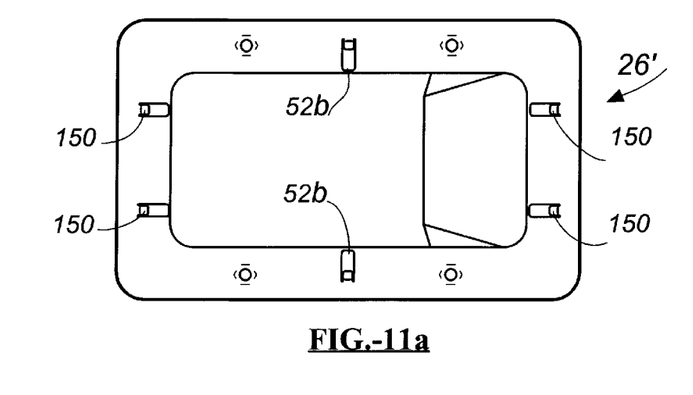
FIGS. 11a, b and c illustrate an alternate embodiment of the present invention.
Figure 11B:
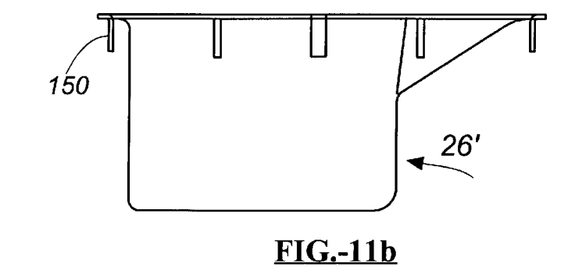
Figure 11C:
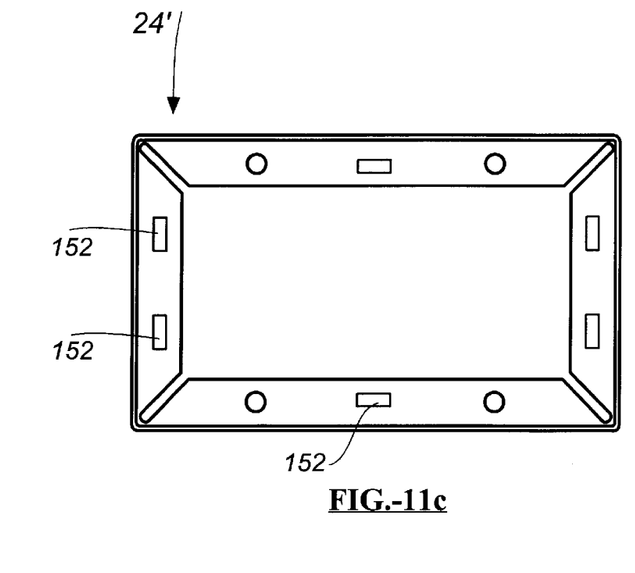
Figure 12A:
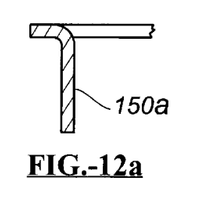
FIGS. 12a–c and 13a–c illustrate alternate alignment formations that may be used with the present invention.
Figure 13A:
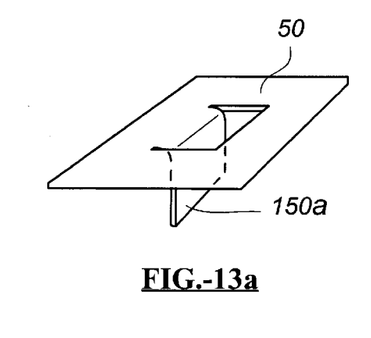

Reference is briefly made to FIGS. 11a, b, and c. FIGS. 11a and b respectively illustrate a top plan view and side plan view of the lower housing member 26'. FIG. 11c is a top plan view of the upper housing member 24'. In all respects, the upper and lower housing members 24' and 26' are identical to those illustrated above with the exception that some of the pins 54a have been replaced by a plurality of tab-style locating formations generally shown as 150. Also, the openings (see 32b of FIG. 3) in the upper housing member have been replaced by complementary tab-shaped receiving formations generally shown as 152 in FIG. 11c. FIGS. 12a and 13a illustrate two views of a bent tab formation 150a. This tab is formed using a stamping operation which cuts away the tab 150a from the adjacent surfaces of the flange 50. The tab is also bent at an angle relative to the flange and will fit into a complementary-sized opening or formation 152 in the flange 28 of the upper housing member 24. Tabs 150a extend through slots or openings 148 in the ends 46a–d of the air bag 42. With the air bag in place upon the tabs 150a and the fasteners 54, the lower housing member 26 is mated with the upper housing member 24. Thereafter each of the tabs may be bent over to prevent separation of the housing parts.

Figure 12B:
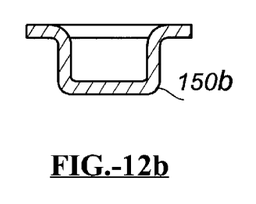
Figure 12C:
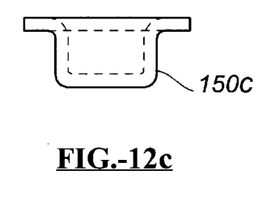
Figure 13B:
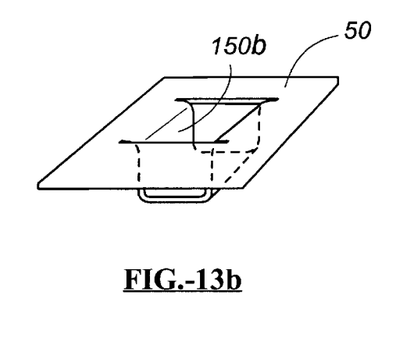
Figure 13C:
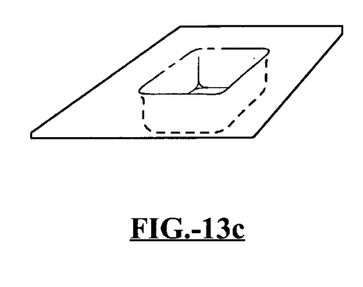
Figure 14A:
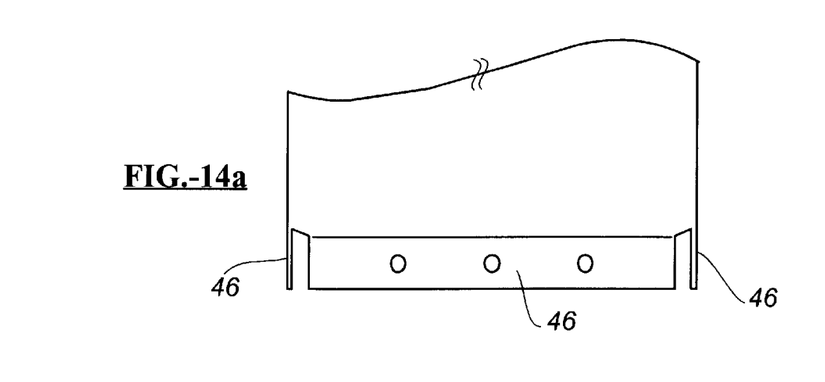
FIGS. 14a–c illustrate an exploded view of an alternate embodiment of the present invention.
Figure 14B:
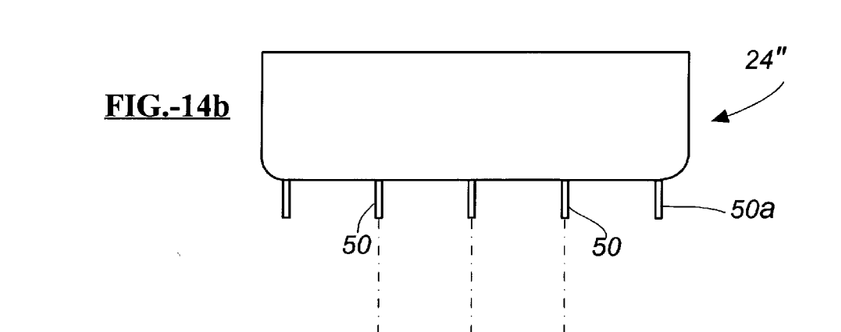
Figure 14C:
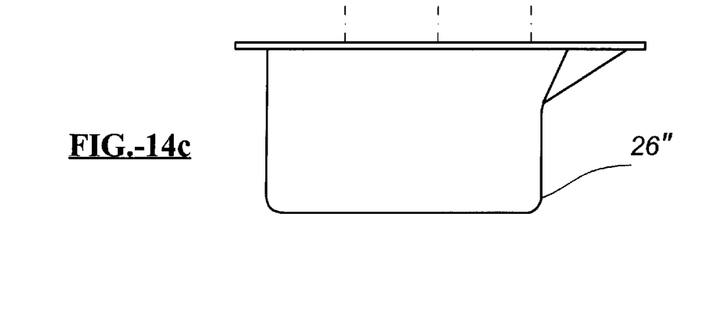
Figure 15:
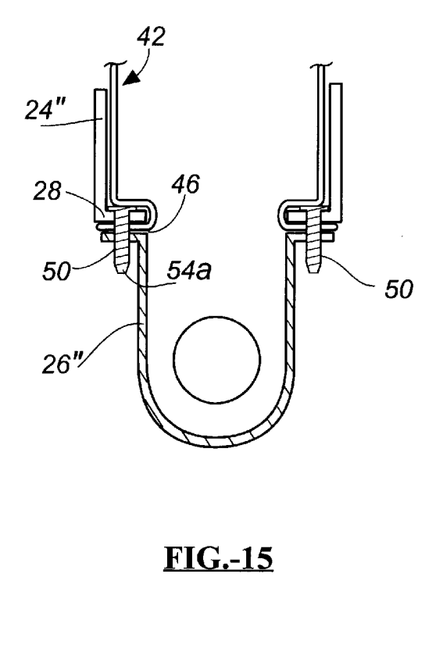
FIG. 15 illustrates a cross sectional view of the embodiment illustrated in FIGS. 14a–c.

Reference is now made to FIGS. 12b and 13b which illustrate a second tab formation 150b which consists of a portion of the flange that is drawn or punched out along cut lines during the stamping operation. This formation 150b forms a loop which fits into complementary openings 152 and 148 in the flange 28 and in the air bag 42. FIGS. 12c and 13c illustrate a knob-style formation consisting of a drawn-out portion of the flange which is not cut away as illustrated in FIGS. 12a and 12b. This knob-style formation 150c provides a projection received through the openings 148 of the air bag and is received within a complementary-sized opening or complementary-formed drawn-out portion in the flange 28 of the upper housing member 24. If desired, the formation 150c can be deformed (such as a rivet) to positively clamp the air bag 42 between the upper and lower housing members.

Reference is briefly made to FIGS. 14a–c and 15. In this embodiment of the invention the flanges 28 and 50 of the upper housing member 24" and flange 50" of the lower housing member 26" are designed to permit the flange 50 to fit below the flange 28 with the air bag ends 46a–d sandwiched therebetween. As illustrated, the various threaded fasteners 54 and/or alignment pins 54a are secured to the upper housing flange 28. Alternatively, the various tab-type formations such as 150a, 150b and 150c can similarly be formed in an upper housing 24". The flange 50 of the lower housing member 26" includes a plurality of openings to receive a respective one of the fasteners 50, 50a, and 150a–c.

Many changes and modifications in the above-described embodiment of the invention can, of course, be carried out without departing from the scope thereof. Accordingly, that scope is intended to be limited only by the scope of the appended claims.

We claim:

1. An air bag module (20) comprising:

an air bag (42) including a neck (44) through which inflation gas is received, the neck having a plurality of ends or flaps (46a–d);

a housing (22) having upper (24) and lower (26) housing members each with a respective flange (28, 50), a respective one of the flaps (46a–d) is sandwiched between the flanges, the lower housing member (26) including an inflator-receiving portion (60), comprising a side wall (62) and opposing first and second end walls (64a, 64b), wherein each end wall includes a respective opening (66, 68);

an inflator (70) received within and supported by the inflator-receiving portion (60), the inflator including a first end (76, 78) a part of which is received within the opening (68) in a second end wall (64b) to close the opening (68), the inflator (70) further including mounting means (80, 82) for securing the inflator to the first end wall (64a), for enclosing the opening (66) in the first end wall (64a) and for generating an outward load on the first end wall (64a) and in so doing generating an outward reaction load on the second end wall (64b).

2. The device as defined in claim 1 wherein the mounting means includes a threaded stud (80) and an outwardly movable nut (82) received upon the stud.

3. The device as defined in claim 1 wherein the lower housing member (26) is nested within the upper housing member (24) with the flaps of the air bag sandwiched therebetween.

4. The device as defined in claim 1 wherein the lower housing member is located below the upper housing member (24) with the flaps of the air bag sandwiched therebetween.

5. The device as defined in claim 1 wherein the upper housing member includes a side wall (30) defining a hollow space in which a folded portion of the air bag is located.

6. The device as defined in claim 1 wherein the lower housing member is off-set relative to the upper housing member to position at least one exit port (72) of the inflator (70) proximate the middle of the folded neck (44) of the folded air bag (42).

7. The device as defined in claim 1 wherein the upper and lower housing members are secured together by one or more fasteners (54, 54a, 150a–c) and wherein one or the other of the upper and lower housing members includes one or more alignment features (54a) to align the housing members to one another.

8. The device as defined in claim 6 where at least some of the fasteners are tab style fasteners.

9. An air bag module (20) comprising:

a housing (22) having an inflator-receiving portion (60), comprising a side wall (62) and opposing first and second end walls (64a, 64b), wherein each end wall includes a respective opening (66, 68);

an inflator (70) received within and supported by the inflator-receiving portion (60), the inflator including a first end (76, 78) a part of which is received within the opening (68) in a second end wall (64b) to close the opening (68), the inflator (70) further including mounting means (80, 82) for securing the inflator to the first end wall (64a), for enclosing the opening (66) in the first end wall (64a) and for generating an outward load on the first end wall (64a) and in so doing generating an outward reaction load on the second end wall (64b) and and air bag (42) disposed to receive inflation gas from the inflator.

10. The device as defined in claim 9 wherein the mounting means includes a threaded stud (80) and an outwardly movable nut (82) received upon the stud.

11. The device as defined in claim 10 wherein the air bag is secured to the inflator.

* * * * *